US012699526B2

(12) United States Patent
Ha et al.

(10) Patent No.: US 12,699,526 B2
(45) Date of Patent: Aug. 4, 2026

(54) METHOD AND APPARATUS TO SELECT A PLANE IN A NAND FLASH DIE TO STORE A READ-ONLY RESERVED BLOCK

(71) Applicant: Intel NDTM US LLC, Santa Clara, CA (US)

(72) Inventors: Chang Wan Ha, San Ramon, CA (US); Quincy S. Chiu, Portland, OR (US); Hoon Koh, San Jose, CA (US); Kristopher H. Gaewsky, El Dorado Hills, CA (US); Aliasgar S. Madraswala, Folsom, CA (US); Bharat M. Pathak, Folsom, CA (US); Pranav Kalavade, San Jose, CA (US); Akshay Jayaraj, Folsom, CA (US); Simerjeet Singh, Galt, CA (US); Zengtao Liu, Eagle, ID (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 0 days.

(21) Appl. No.: 17/677,845

(22) Filed: Feb. 22, 2022

(65) Prior Publication Data

US 2023/0266910 A1 Aug. 24, 2023

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 6,490,235 | B1 * | 12/2002 | Iida | ............................. G06F 3/16 369/33.01 |
| 7,746,699 | B1 | 6/2010 | Edwards et al. | |
| 10,019,332 | B1 * | 7/2018 | Sehgal | ..................... G06F 11/24 |
| 10,153,046 | B1 * | 12/2018 | Agarwal | ................ G11C 16/10 |
| 2009/0106543 | A1 * | 4/2009 | Pekny | .................. G06F 13/1668 713/2 |
| 2009/0154245 | A1 | 6/2009 | Shirakawa et al. | |
| 2010/0095106 | A1 * | 4/2010 | Alexander | ............ G06F 9/4408 713/2 |
| 2013/0159601 | A1 * | 6/2013 | Lassa | ................... G06F 12/0246 711/170 |
| 2014/0219038 | A1 | 8/2014 | Ryu et al. | |

(Continued)

FOREIGN PATENT DOCUMENTS

| | | | | | |
|---|---|---|---|---|---|
| KR | 20100053203 | A | * | 5/2010 | ......... G06F 12/0246 |

OTHER PUBLICATIONS

International Search Report and Written Opinion for PCT Patent Application No. PCT/US23/10652, Mailed May 10, 2023, 9 pages.

(Continued)

*Primary Examiner* — Jared I Rutz
*Assistant Examiner* — Elias Young Kim
(74) *Attorney, Agent, or Firm* — Morgan, Lewis & Bockius LLP

(57) ABSTRACT

Manufacturing yield loss of NAND Flash dies is reduced by selecting a plane to store a read-only reserved block and another plane to store a backup read-only reserved block based on the Number of Valid Blocks (NVB) blocks in each plane in the NAND Flash array.

20 Claims, 8 Drawing Sheets

(56) References Cited

U.S. PATENT DOCUMENTS

| | | | |
|---|---|---|---|
| 2014/0226426 | A1 | 8/2014 | Uvieghara et al. |
| 2014/0313841 | A1 | 10/2014 | Lee et al. |
| 2016/0077749 | A1* | 3/2016 | Ravimohan ............. G06F 3/064 |
| | | | 711/103 |
| 2016/0267003 | A1* | 9/2016 | Morio ................. G06F 12/0246 |
| 2019/0205043 | A1* | 7/2019 | Huang ................ G06F 12/1009 |
| 2022/0197534 | A1* | 6/2022 | Ock ........................ G06F 3/064 |

OTHER PUBLICATIONS

Intel NDTM US LLC, PCT/US2023/010652, International Preliminary Report on Patentability, Aug. 27, 2024, 5 pgs.

* cited by examiner

106

| Plane 0 (P0) 202-1 | Plane 1 (P1) 202-2 | Plane 2 (P2) 202-3 | Plane 3 (P3) 202-4 |
|---|---|---|---|
| | Read-only Reserved Block 204 | | Backup Read-only Reserved Block 206 |

| Fuse Bit 0 for P0 | Fuse Bit 1 for P1 | Fuse Bit 2 for P2 | Fuse Bit 3 for P3 | Read-only Reserved Block, Backup Read-only Reserved Block | |
|---|---|---|---|---|---|
| 1 | 1 | 1 | 1 | P0, P1 | ~402 |
| 0 | 0 | 1 | 1 | P0, P1 | ~404 |
| 0 | 1 | 0 | 1 | P0, P2 | |
| 0 | 1 | 1 | 0 | P0, P3 | |
| 1 | 0 | 0 | 1 | P1, P2 | |
| 1 | 0 | 1 | 0 | P1, P3 | |
| 1 | 1 | 0 | 0 | P2, P3 | ~406 |

Obtain location of
Read-only Reserved
Block

702

Read NAND Flash die
specific information
stored in the Read-only
Reserved Block

METHOD AND APPARATUS TO SELECT A PLANE IN A NAND FLASH DIE TO STORE A READ-ONLY RESERVED BLOCK

FIELD

This disclosure relates to non-volatile memory devices and in particular to NAND Flash memory devices.

BACKGROUND

Non-volatile memory refers to memory whose state is determinate even if power is interrupted to the device. Storage devices that include non-volatile memory include a secure digital card, a multimedia card, a flash drive (for example, a Universal Serial Bus (USB) flash drive also known as a "USB thumb drive" or "USB memory stick" that includes non-volatile memory with an integrated USB interface), and a solid-state drive. The non-volatile memory can comprise a block addressable memory device, such as NAND, or more specifically, multi-threshold level NAND Flash memory (for example, Single-Level Cell ("SLC"), Multi-Level Cell ("MLC"), Quad-Level Cell ("QLC"), Tri-Level Cell ("TLC"), or some other NAND). The NAND Flash cell uses the threshold voltage of a floating-gate transistor to represent the data stored in the cell.

BRIEF DESCRIPTION OF THE DRAWINGS

Features of embodiments of the claimed subject matter will become apparent as the following detailed description proceeds, and upon reference to the drawings, in which like numerals depict like parts, and in which:

FIG. 4 is a table illustrating encoding of fuse bits in the fuse bit circuitry shown in FIG. 3 to planes in the 3D NAND Flash array;

Figure 1:
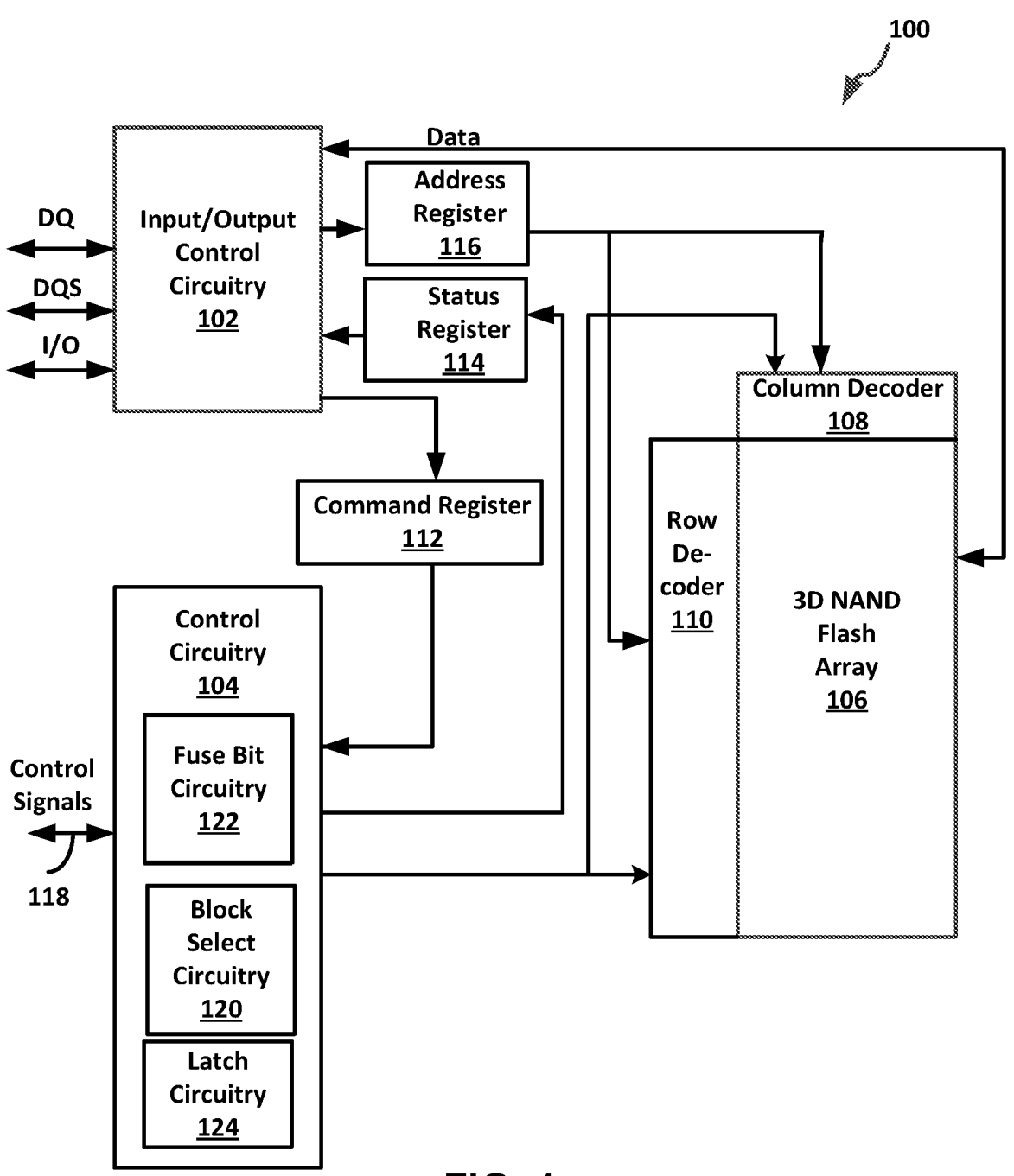
FIG. 1 is a block diagram of a 3D (Three-Dimensional) NAND device.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined as set forth in the accompanying claims.

DESCRIPTION OF EMBODIMENTS

A NAND flash die includes circuitry to perform read/write/erase operations and a NAND flash array. The NAND flash array is tested by the manufacturer to determine the number of invalid blocks due to process defects. The NAND flash die is deemed to be defective if the total number of valid blocks is less than a minimum Number of Valid Blocks (NVB) in the NAND flash die.

The NAND flash array can be partitioned into multiple planes with each plane having blocks that are connected through the same bit line. In a NAND flash array with multiple planes, the NAND NVB is based on the NVB in each of the planes. For example, in a NAND flash array with 4 planes with each plane having X blocks, if the NAND NVB is Y, the NAND flash die is deemed to be defective if any of the 4 planes has less than Y NVB blocks. The NAND NVB listed in the data sheet is the lowest NVB. For example, if plane 0 has Y NVB blocks, plane 1 has Y+1 NVB blocks, plane 2 has Y+2 NVB blocks and plane 3 has Y+5 NVB blocks, as the lowest NAND NVB is Y (for plane 0), the NAND flash die is not defective.

The manufacturer of the NAND Flash die stores NAND Flash die specific information in a read-only reserved block at a fixed block address in a fixed plane (also referred to as a fixed plane location) in the NAND Flash array. The NAND Flash die specific information can also be stored in a backup read-only reserved block at a fixed block address in a different fixed plane in the NAND Flash array. The NAND Flash die specific information includes memory cell related voltage, timing parameters, column repairs, block repairs and bad block address information. The read-only reserved block and the backup read-only reserved block are not included in the NAND NVB.

In a NAND flash array with 4 planes, the read-only reserved block can be at a fixed block address in a plane (for example, plane 0) and the backup read-only reserved block can be at a fixed block address in another plane (for example, plane 1). As the read-only reserved block and backup read-only reserved block are used to store NAND Flash die specific information that is used for the initialization of the NAND Flash die, these blocks not included in the number of NAND NVB per plane. The read-only reserved block at a fixed block address in plane 0 reduces the number of NVB blocks in plane 0 by one. The backup read-only reserved block at a fixed block address in plane 1 reduces the NVB blocks in plane 1 by one. Referring to the earlier example, the number of NVB blocks (Y) in plane 0 is reduced by one to Y−1 NVB blocks to store the read-only reserved block and the number of NVB blocks (Y+1) in plane 1 is reduced by one to Y NVB blocks to store the backup read-only reserved block. Plane 2 has Y+2 NVB blocks and plane 3 has Y+5 NVB blocks. As the lowest NAND NVB is Y−1 (less than Y, for plane 0) NVB blocks, the NAND flash die is defective and cannot be shipped, which results in a manufacturing yield loss.

Manufacturing yield loss of NAND Flash dies is reduced by selecting a plane to store the read-only reserved block and another plane to store the backup read-only reserved block based on the NVB blocks in each plane in the NAND Flash array.

Referring to the earlier example, plane 3 has the highest number of NVB blocks (Y+5) and plane 2 has the next highest number of NVB blocks (Y+2). the read-only reserved block is stored in plane 3 and the number of NVB blocks (Y+5) in plane 3 is reduced by one to Y+4. The backup read-only reserved block is stored in plane 2 and the number of NVB blocks (Y+2) in plane 2 is reduced by one to Y+1. As the lowest NAND NVB is Y (for plane 0), the NAND flash die is not defective and can be shipped.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

FIG. 1 is a block diagram of a 3D (Three-Dimensional) NAND device 100. The 3D NAND device 100 includes Input/Output Control circuitry 102 and control circuitry 104 that are coupled to a host memory controller (not shown) via a plurality of control and data signals. The 3D NAND device 100 also includes a 3D NAND Flash array 106 that includes a plurality of NAND cells organized in rows and columns.

A row decoder 110 and a column decoder 108 are provided to decode address signals to access the 3D NAND Flash array 106. The 3D NAND device 100 further includes Input/Output (I/O) control circuitry 102 to manage input of commands, addresses, and data to the 3D NAND device 100 and the output of data and status information from the 3D NAND device 100 stored in status register 114. An address register 116 is in communication with I/O control circuitry 102, and row decoder 110 and column decoder 108, to latch the address signals prior to decoding. A command register 112 is in communication with I/O control circuitry 102 and control circuitry 104 to latch incoming commands.

Control circuitry 104 controls access to the 3D NAND Flash array 106 in response to the commands and generates status information. Control circuitry 104 is in communication with row decoder 110 and column decoder 108 to control the row decoder 110 and column decoder 108 in response to the addresses. Additionally, control circuitry 104 can issue erase commands that trigger activation of one or more high voltage transistors within row decoder 110 and column decoder 108.

The Input/Output Control circuitry 102 in the 3D NAND device 100 communicates with the host memory controller via a bidirectional data bus (DQ) and a bidirectional data strobe (DQS) signal. The DQS signal is used to indicate a data valid window. The control circuitry 104 in the 3D NAND device 100 receives control signals 118 from the host memory controller. The control signals 118 that are received include chip enable (CE #) to select the 3D NAND device 100 for data transfer with the host memory controller, Address Latch Enable (ALE) to indicate the type of bus cycle (command, address or data), Command Latch Enable (CLE) to indicate the type of bus cycle (command, address or data), Read Enable (RE #), Write Enable (WE #), and Write Protect (WP #) to disable program and erase operations. The 3D NAND device 100 also includes control signals 118 output by control circuitry 104 that include a Ready/Busy (R/B #) signal to indicate whether the 3D NAND device 100 is executing an operation ("busy") or is ready for a next operation. The Open NAND Flash Interface (ONFI) is a standard that defines the operation of the data bus and the control signals.

Control circuitry 104 includes block select circuitry 120 that is used during initialization of the 3D NAND device 100 following power up of the 3D NAND device 100. A RESET command (0xFF sent over the DQ bus) is the first command issued to the 3D NAND device 100 following power up to initiate the initialization of the 3D NAND device 100. The I/O Control Circuitry 102 writes 0xFF (RESET command) to the command register 112 that is read by the control circuitry 104 to initiate the initialization of the 3D NAND device 100.

Control circuitry 104 includes fuse bit circuitry 122 that includes one or more fuses that are blown during the wafer test or the package test process in manufacturing to select a plane to store the read-only reserved block and another plane to store the backup read-only reserved block based on the NVB blocks in each plane in the NAND Flash array 106. During initialization, the block control circuitry 120 loads the specific information used for initialization of the 3D NAND device 100 from the plane identified by the fuse bit circuitry 122. The specific information used for initialization of the 3D NAND device 100 is stored in the read-only reserved block and the backup read-only reserved block. The block control circuitry 120 loads the specific information from the read-only reserved block or the backup read-only reserved block to latch circuitry 124 as part of initialization process for the 3D NAND device 100.

It will be appreciated that the memory device of FIG. 1 may include additional circuitry and signals, and that the functional blocks of the memory device may not necessarily be segregated as shown in this example case. For example, a single component or component portion of an integrated circuit device could be adapted to perform the functionality of more than one block component of FIG. 1. Alternatively, or in addition, functionality of a single block component of FIG. 1 may be distributed into multiple blocks. Additionally, while specific I/O pins are described in accordance with popular conventions for receipt and output of the various signals, it is noted that other combinations or numbers of I/O pins may be used in the various embodiments. Many variations will be appreciated.

Figure 2:
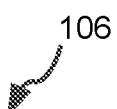
FIG. 2 is an example of a NAND array organization in the 3D NAND Flash array shown in FIG. 1.

FIG. 2 is an example of a NAND array organization in the 3D NAND Flash array 106 shown in FIG. 1. The 3D NAND Flash array 106 is divided into multiple physical planes, plane 0 (P0) 202-1, plane 1 (P1) 202-2, plane 2 (P2) 202-3, plane 3 (P3) 202-4. Each physical plane 202-1, 202-2, 202-3, 202-4 has respective cache register (not shown) and data register (not shown) independent of the other planes allowing multi-plane operations to perform concurrent Read, Program or Erase operations on multiple planes. Each plane 202-1, 202-2, 202-3, 202-4 includes a plurality of blocks.

The physical plane 202-1, 202-2, 202-3, 202-4 to store the read-only reserved block 204 and the physical plane 202-1, 202-2, 202-3, 202-4 to store the backup read-only reserved block 206 are selected during the wafer test or the package test process in manufacturing based on the NVB blocks in each physical plane 202-1, 202-2, 202-3, 202-4 in the NAND Flash array 106. In the example shown in FIG. 2 the read-only reserved block 204 is stored in plane 202-2 and the backup read-only reserved block 206 is stored in plane 202-4.

Figure 3:
FIG. 3 is a block diagram of the fuse bit circuitry shown in FIG. 1.
Figure 3:
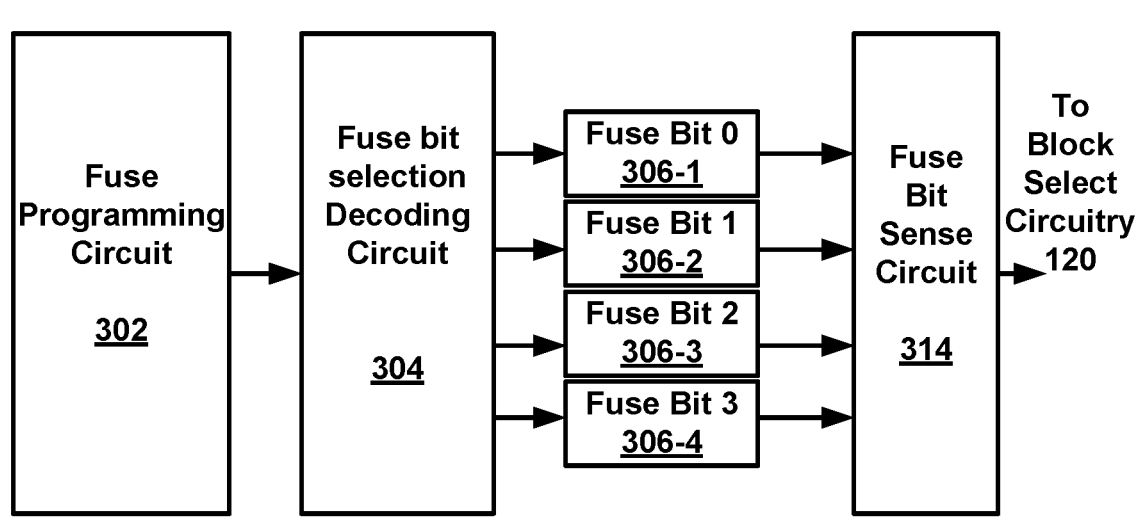

FIG. 3 is a block diagram of the fuse bit circuitry 122 shown in FIG. 1. The fuse bit circuitry 122 includes a fuse programming circuit 302, a fuse bit selection decoding circuit 304, fuse bits, fuse bit 0 306-1, fuse bit 1 306-2, fuse bit 2 306-3, fuse bit 3 306-4 and a fuse bit sense circuit 314.

The fuse programming circuit 302 and the fuse bit selection decoding circuit 304 are used once during the wafer test or the package test process in manufacturing to select and blow one or more fuse bits 306-1, 306-2, 306-3, 306-4 to select a plane to store the read-only reserved block and another plane to store the backup read-only reserved block based on the NVB blocks in each plane in the NAND Flash array 106.

During initialization of the 3D NAND device 100 following power up of the 3D NAND device 100, fuse bit sense circuit 314 detects the state (blown, not blown) of each of the fuse bits 306-1, 306-2, 306-3, 306-4. The state of each of the fuse bits 306-1, 306-2, 306-3, 306-4 is used by the block control circuitry 120 to select the two planes 202-1, 202-2, 202-3, 202-4 that store the specific information used for initialization of the 3D NAND device 100.

FIG. 4 is a table illustrating encoding of fuse bits 306-1, 306-2, 306-3, 306-4 in the fuse bit circuitry 122 shown in FIG. 3 to planes P0-P3 202-1, 202-2, 202-3, 202-4 in the 3D NAND Flash array 106.

At row 402, none of the fuse bits 306-1, 306-2, 306-3, 306-4 are blown (all fuse bits are '1'). Default planes (P0, P1) are selected to store the read-only reserved block and the backup read-only reserved block.

At row 404, fuse bit 0 306-1 is blown (fuse bit is '0') to select plane P0 202-1 to store the read-only reserved block. Fuse bit 1 306-2 is blown (fuse bit is '0') to select plane P1 202-2 to store the backup read-only reserved block.

At row 406, fuse bit 0 306-2 is blown (fuse bit is '0') to select plane P2 202-1 to store the read-only reserved block. Fuse bit 3 306-4 is blown (fuse bit is '0') to select plane 3 202-3 to store the backup read-only reserved block.

Figure 5:
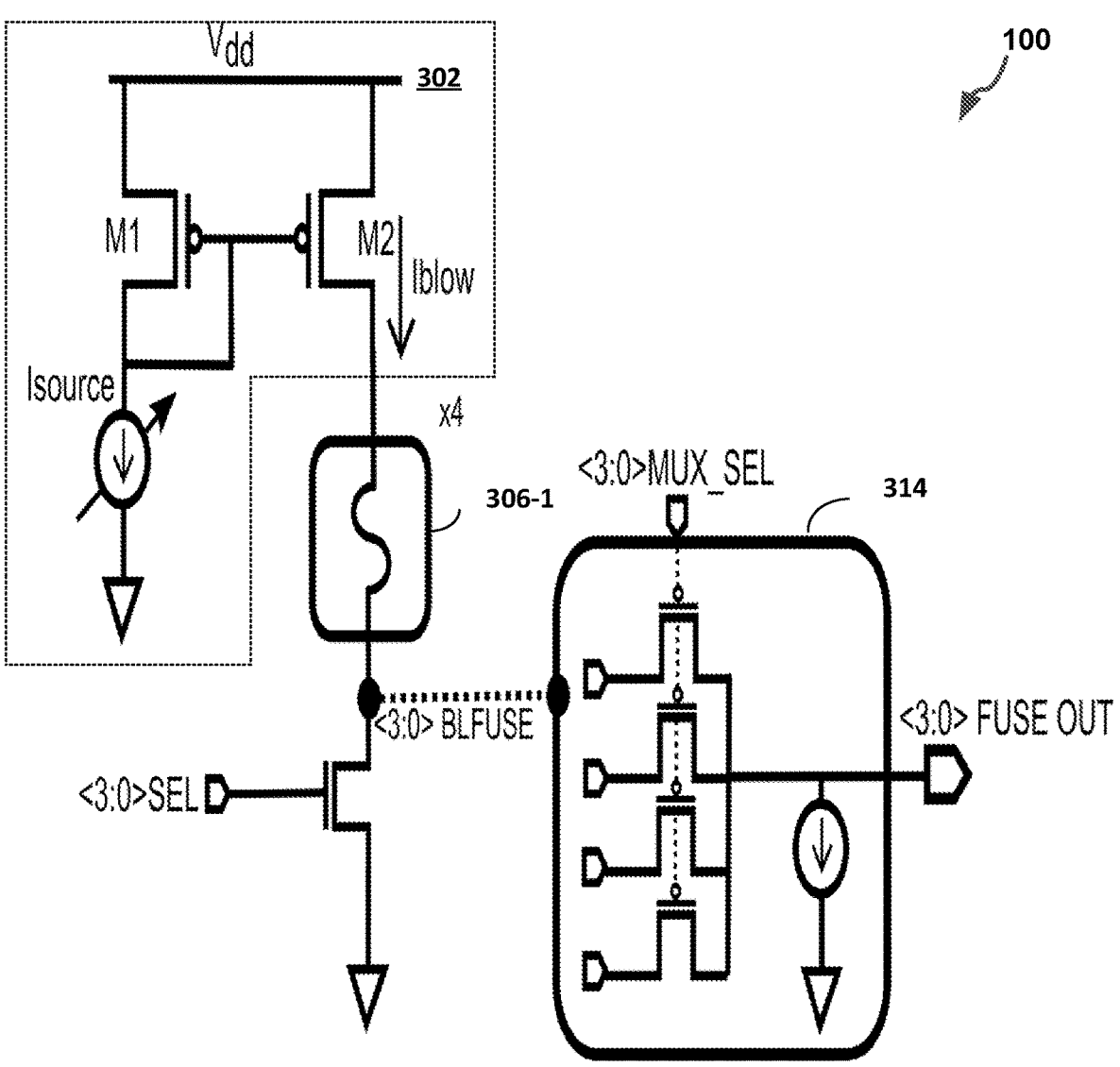
FIG. 5 is a circuit diagram of the fuse bit circuitry shown in FIG. 3.

In the embodiment described in conjunction with FIG. 5 there are four planes, that is, an even number of planes greater than two. In another embodiment, the number of planes can be increased by two to six planes and the number of fuses increased to six, three pairs of planes with one fuse per plane. In yet another embodiment, the number of planes can be eight, with four pairs of planes.

FIG. 5 is a circuit diagram of the fuse bit circuitry 122 shown in FIG. 3. The fuse programming circuit 302 includes two Field Effect Transistors (FET) M1, M2. Each FET M1, M2 includes a source, drain and gate. The gate of M2 is connected to the gate of M1. The source of FET M1 and the source of FET M2 are connected to the power supply voltage Vdd.

The drain of FET M2 provides the current Iblow to blow the fuse bits 306-1, 306-2, 306-3, 306-4. The current Iblow to blow the fuse bits 306-1, 306-2, 306-3, 306-4 is trimmed (set) by using multiple bits (representing a digitized number) to adjust the source current Isource. One fuse bit 306-1 is shown in the circuit diagram. The fuse bit 306-1 can be a poly fuse, metal fuse, transistor fuse, laser fuse, or any other electrical fuse. A simple decoding circuit is used to select the fuse bit 306-1 to be blown.

Fuse bit sense circuit 314 includes a FET for each fuse. The fuse bit sense circuit 314 is a weak leaker based detector that detects the state (blown, not blown) of each of the fuse bits 306-1, 306-2, 306-3, 306-4. If a fuse is blown, due to the weak leaker, the level of the signal at the output of the fuse is a low voltage level. If the fuse is not blown, the weak leaker based detector is not strong enough to pull the output of the fuse to a low voltage level so the output of the fuse remains at a high voltage level.

Figure 6:
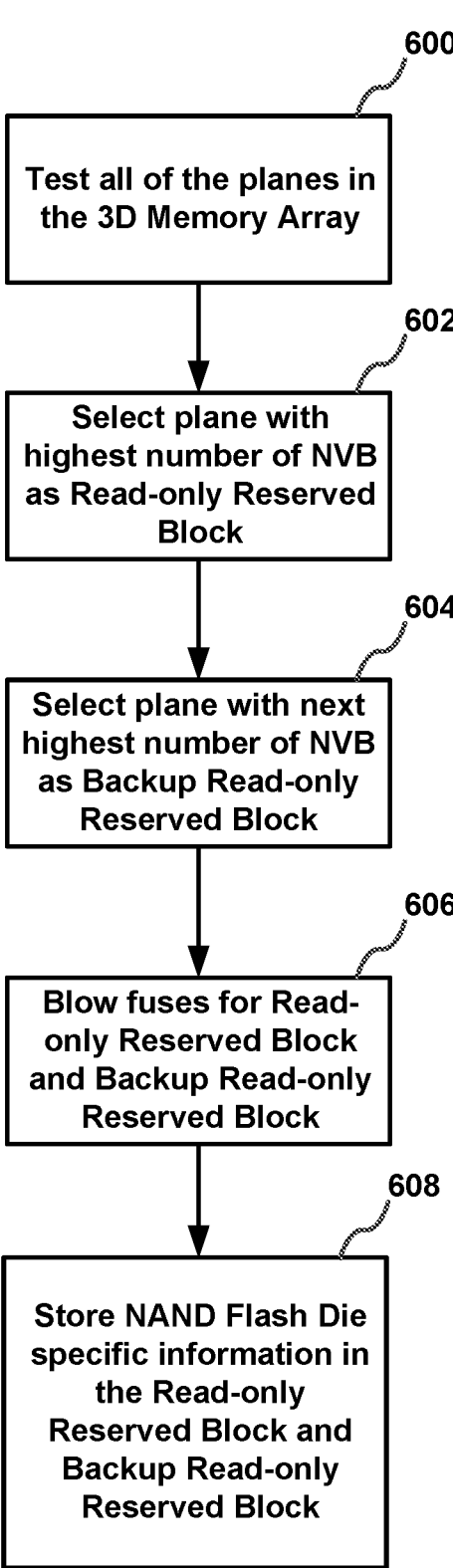
FIG. 6 is a flowgraph of a method performed during the wafer test or the package test process in manufacturing to store NAND Flash die specific information in the 3D NAND Flash device.

FIG. 6 is a flowgraph of a method performed during the wafer test or the package test process in manufacturing to store NAND Flash die specific information in the 3D NAND Flash device.

At block 600, planes 0-3 202-1, 202-2, 202-3, 202-4 in the 3D NAND Flash array 106 are tested.

At block 602, the plane with the highest number of NVB is selected to store the Read-only Reserved Block 204.

At block 604, the plane with the next highest number of NVB is selected to store the Backup Read-only Reserved Block 206.

At block 606, fuse programming circuit 302 blows the fuse bit 306-1, 306-2, 306-3, 306-4 for the plane with the highest number of NVB and the fuse bit 306-1, 306-2, 306-3, 306-4 for the plane with the next highest number of NVB for the Backup Read-only Reserved Block At block 608, fuse bit circuitry 122 stores the plane selected to store the Read-only Reserved Block 204 and the plane selected to store the Backup Read-only Reserved Block 206.

Figure 7:
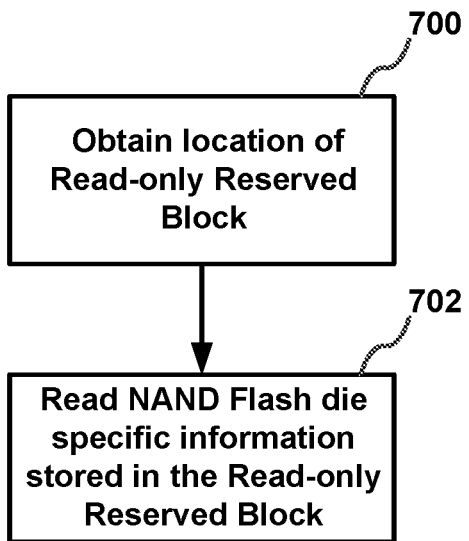
FIG. 7 is a flowgraph of a method to read the NAND Flash die specific information from the 3D NAND Flash device array during initialization of the 3D NAND device after power-on reset.

FIG. 7 is a flowgraph of a method to read the NAND Flash die specific information from the 3D NAND Flash device array 106 during initialization of the 3D NAND device after power-on reset.

At block 700, the block select circuitry 120 obtains the location of the read-only reserved block 204 in the 3D NAND Flash array 106 encoded in fuses in the control circuitry 104 from the fuse bit sense circuit 314 in the fuse bit circuitry 122.

At block 702, the block select circuitry 120 reads the NAND Flash die specific information stored in the read-only reserved block 204 in the 3D-NAND Flash array 106.

Figure 8:
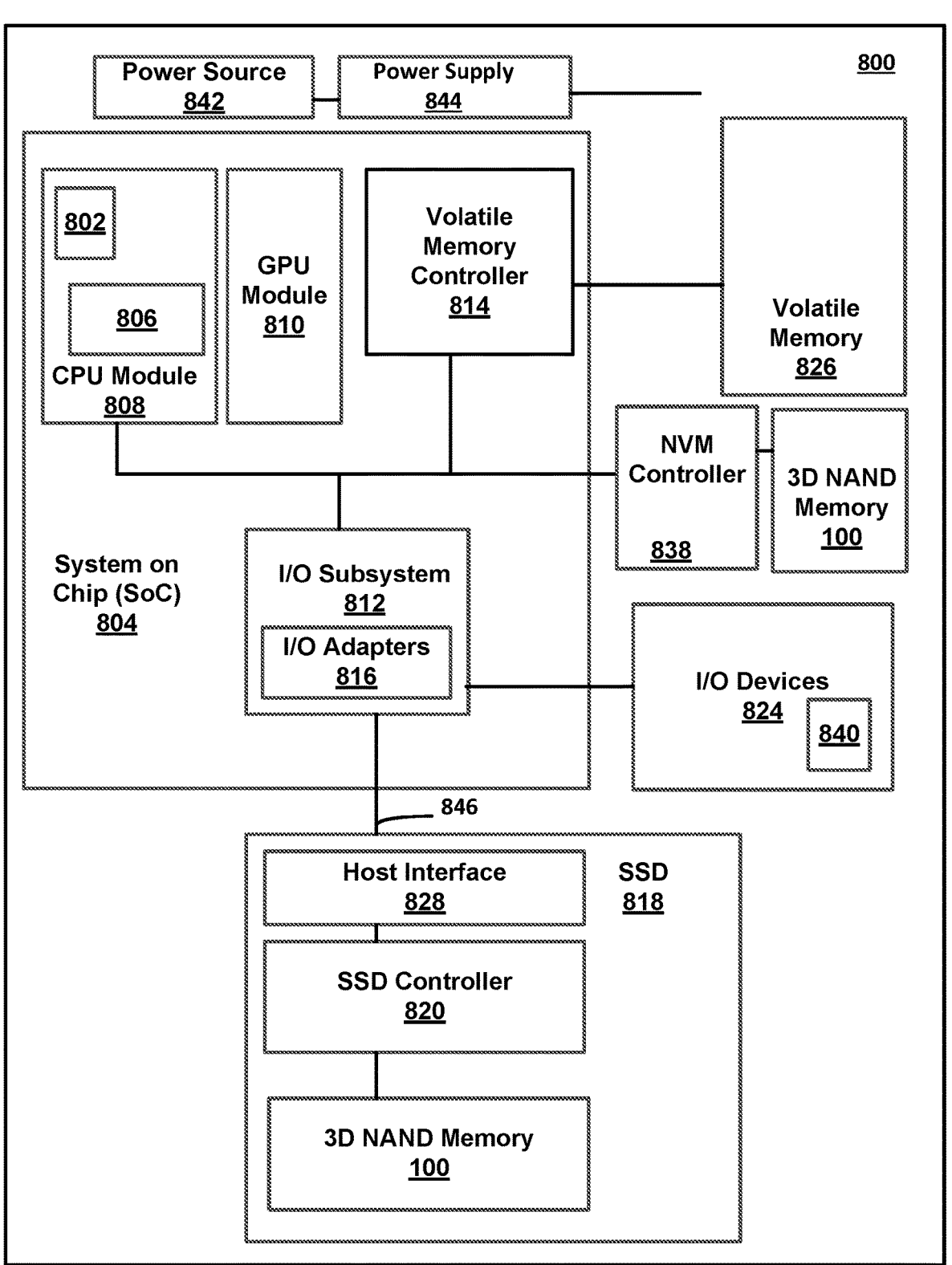
FIG. 8 is a block diagram of a computer system that includes 3D NAND device.

FIG. 8 is a block diagram of a computer system 800 that includes the 3D NAND device 100. Computer system 800 can correspond to a computing device including, but not limited to, a server, a workstation computer, a desktop computer, a laptop computer, and/or a tablet computer.

The computer system 800 includes a volatile memory 826 and a system on chip (SOC or SoC) 804 which combines processor, graphics, memory, and Input/Output (I/O) control logic into one SoC package. The SoC 804 includes at least one Central Processing Unit (CPU) module 808, a volatile memory controller 814, and a Graphics Processor Unit (GPU) 810. In other embodiments, the volatile memory controller 814 can be external to the SoC 804. The CPU module 808 includes at least one processor core 802 and a level 2 (L2) cache 806. Although not shown, each of the processor core(s) 802 can internally include one or more instruction/data caches, execution units, prefetch buffers, instruction queues, branch address calculation units, instruction decoders, floating point units, retirement units, etc. The CPU module 808 can correspond to a single core or a multi-core general purpose processor, such as those provided by Intel® Corporation, according to one embodiment.

The Graphics Processor Unit (GPU) module 810 can include one or more GPU cores and a GPU cache which can store graphics related data for the GPU core. The GPU core can internally include one or more execution units and one or more instruction and data caches. Additionally, the Graphics Processor Unit (GPU) 810 can contain other graphics logic units that are not shown in FIG. 8, such as one or more vertex processing units, rasterization units, media processing units, and codecs.

Within the I/O subsystem 812, one or more I/O adapter(s) 816 are present to translate a host communication protocol utilized within the processor core(s) 802 to a protocol compatible with particular I/O devices. Some of the protocols that adapters can be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 816 can communicate with external I/O devices 824 which can include, for example, user interface device(s) including a display and/or a touch-screen display 840, printer, keypad, keyboard, communication logic, wired and/or wireless, storage device(s) including hard disk drives ("HDD"), solid-state drives ("SSD") 818, removable storage media, Digital Video Disk (DVD) drive, Compact Disk (CD) drive, Redundant Array of Independent Disks (RAID), tape drive or other storage device. The storage devices can be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (Non-Volatile Memory Express) over PCIe (Peripheral Component Interconnect Express), and SATA (Serial ATA (Advanced Technology Attachment)).

Additionally, there can be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

The I/O adapter(s) 816 can also communicate with a storage device, that can be a hard disk drive (HDD) or a solid-state drive ("SSD") 818 which includes a SSD controller 820, a host interface 828 and the 3D NAND device 100.

The computer system 800 can include the 3D NAND device 100 and a non-volatile memory controller 838 communicatively coupled to the CPU module 808 in the SoC 804. The 3D NAND device 100 can be included in a dual in-line memory module (DIMM) that can be referred to as a non-volatile dual in-line memory module (NVDIMM).

The I/O adapters 816 can include a Peripheral Component Interconnect Express (PCIe) adapter that is communicatively coupled using the NVMe (NVM Express) over PCIe (Peripheral Component Interconnect Express) protocol over bus 846 to a host interface 828 in the solid state drive 818. Non-Volatile Memory Express (NVMe) standards define a register level interface for host software to communicate with a non-volatile memory subsystem (for example, a Solid-state Drive (SSD)) over Peripheral Component Interconnect Express (PCIe), a high-speed serial computer expansion bus). The NVM Express standards are available at www.nvmexpress.org. The PCIe standards are available at www.pcisig.com.

Volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein can be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD208-3B, August 2013 by JEDEC), LPDDR4) LPDDR version 4, JESD209-4, originally published by JEDEC in August 2014), WI02 (Wide Input/Output version 2, JESD229-2 originally published by JEDEC in August 2014, HBM (High Bandwidth Memory, JESD325, originally published by JEDEC in October 2013, DDR5 (DDR version 5, currently in discussion by JEDEC), LPDDR5 (currently in discussion by JEDEC), HBM2

(HBM version 2), currently in discussion by JEDEC, or others or combinations of memory technologies, and technologies based on derivatives or extensions of such specifications. The JEDEC standards are available at www.jedec.org.

Power source 842 provides power to the components of system 800. More specifically, power source 842 typically interfaces to one or multiple power supplies 844 in system 800 to provide power to the components of system 800. In one example, power supply 844 includes an AC to DC (alternating current to direct current) adapter to plug into a wall outlet. Such AC power can be renewable energy (e.g., solar power) power source 842. In one example, power source 842 includes a DC power source, such as an external AC to DC converter. In one example, power source 842 or power supply 844 includes wireless charging hardware to charge via proximity to a charging field. In one example, power source 842 can include an internal battery or fuel cell source.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

What is claimed is:

1. A non-volatile memory device, comprising:
a NAND flash array comprising a plurality of planes, a read-only reserved block in one of the plurality of planes to store NAND flash die specific information, wherein the read-only reserved block is stored in a first plane that is selected among the plurality of planes based on the first plane having the highest number of valid blocks; and
control circuitry comprising a plurality of fuses, the control circuitry to obtain a location of the read-only reserved block encoded in the plurality of fuses during initialization of the non- volatile memory device after power-on reset;
wherein the NAND flash die specific information is also stored in a backup read-only reserved block in a second plane, and the second plane is selected among the plurality of planes to store the backup read-only reserved block based on the second plane having the second highest number of valid blocks.

2. The non-volatile memory device of claim 1, wherein the plurality of fuses include four fuses, and the plurality of planes include four planes.

3. The non-volatile memory device of claim 1, wherein the NAND flash array is a three-dimensional (3D) NAND flash array.

4. The non-volatile memory device of claim 1, wherein the plurality of planes include an even number of planes, and the even number is greater than two.

5. A system, comprising:
a memory controller; and
a non-volatile memory device coupled with the memory controller, the non-volatile memory device comprising:
a NAND flash array comprising a plurality of planes, a read-only reserved block in one of the plurality of planes to store NAND flash die specific information, wherein the read-only reserved block is stored in a first plane that is selected among the plurality of planes based on the first plane having the highest number of valid blocks; and
control circuitry comprising a plurality of fuses, the control circuitry to obtain a location of the read-only reserved block encoded in the plurality of fuses during initialization of the non-volatile memory device after power-on reset;
wherein the NAND flash die specific information is also stored in a backup read-only reserved block in a second plane, and the second plane is selected among the plurality of planes to store the backup read-only reserved block based on the second plane having the second highest number of valid blocks.

6. The system of claim 5, further comprising on or more of:
a display communicatively coupled to at least one processor; or a power supply to provide power to the system.

7. The system of claim 5, wherein the plurality of fuses include four fuses, and the plurality of planes include four planes.

8. The system of claim 5, wherein the NAND flash array is a three-dimensional (3D) NAND flash array.

9. The system of claim 5, wherein the plurality of planes include an even number of planes, and the even number is greater than two.

10. A method, comprising:
obtaining a location of a read-only reserved block encoded in a plurality of fuses in control circuitry of a non-volatile memory device during initialization of the non-volatile memory device after power-on reset, the non-volatile memory device comprising a NAND flash array comprising plurality of planes, wherein the read-only reserved block is stored in a first plane that is selected among the plurality of planes based on the first plane having the highest number of valid blocks; and
reading NAND flash die specific information in the read-only reserved block;
wherein the NAND flash die specific information is also stored in a backup read-only reserved block in a second plane, and the second plane is selected among the plurality of planes to store the backup read-only reserved block based on the second plane having the second highest number of valid blocks.

11. The method of claim 10, wherein the plurality of fuses include four fuses, and the plurality of planes include four planes.

12. The method of claim 10, wherein the NAND flash array is a three-dimensional (3D) NAND flash array.

13. The method of claim 10, wherein the plurality of planes include an even number of planes, and the even number is greater than two.

14. The non-volatile memory device of claim 1, wherein the NAND flash die specific information includes one or more of: a memory cell related voltage, timing parameters, column repairs, block repairs, and bad block address information.

15. The system of claim 5, wherein the NAND flash die specific information includes one or more of: a memory cell related voltage, timing parameters, column repairs, block repairs, and bad block address information.

16. The method of claim 10, wherein the NAND flash die specific information includes one or more of: a memory cell related voltage, timing parameters, column repairs, block repairs, and bad block address information.

17. The non-volatile memory device of claim 1, wherein each of the plurality of planes has one or more respective registers that are configured to facilitate a plurality of concurrent memory operations on the plurality of planes.

18. The method of claim 10, wherein the second plane is distinct from the first plane.

19. The system of claim 5, wherein the ready-only reserved block is excluded from the highest number of valid blocks of the first plane, and the block ready-only reserved block is excluded from the second highest number of valid blocks of the second plane.

20. The non-volatile memory device of claim 1, wherein the control circuitry is configured to load the NAND flash die specific information from the read-only reserved block or the backup read-only reserved block during initialization of the non-volatile memory device.

* * * * *